United States Patent
Harris

(10) Patent No.: US 9,106,724 B1
(45) Date of Patent: Aug. 11, 2015

(54) COMMUNICATION AGGREGATION

(71) Applicant: inContact, Inc., Midvale, UT (US)

(72) Inventor: Timothy S. Harris, Lehi, UT (US)

(73) Assignee: inContact, Inc., Midvale, UT (US)

( * ) Notice: Subject to any disclaimer, the term of this patent is extended or adjusted under 35 U.S.C. 154(b) by 0 days.

(21) Appl. No.: 14/585,622

(22) Filed: Dec. 30, 2014

(51) Int. Cl.
*H04M 3/00* (2006.01)
*H04M 5/00* (2006.01)
*H04M 7/00* (2006.01)
*H04M 3/51* (2006.01)

(52) U.S. Cl.
CPC .......... *H04M 7/0048* (2013.01); *H04M 3/5183* (2013.01)

(58) Field of Classification Search
USPC ......................................... 379/265.09, 88.21
See application file for complete search history.

(56) References Cited

U.S. PATENT DOCUMENTS 6,104,789 A * 8/2000 Lund ..................... 379/93.23
2011/0235797 A1 * 9/2011 Huet et al. ............ 379/265.09

* cited by examiner

*Primary Examiner* — Quynh Nguyen
(74) *Attorney, Agent, or Firm* — Maschoff Brennan

(57) ABSTRACT

A text communication aggregator stores text communications between patrons and a contact handling system. The communications each include a tag identifying senders of the text communications. The aggregator further provides the stored text communications as threaded conversations. Each of the threaded conversations include text communications between a particular patron and the contact handling system, and each of the threaded conversations is associated with the particular patron. The aggregator further provides identifiers that identify threaded conversations having at least one new text communication from the patrons.

14 Claims, 2 Drawing Sheets

COMMUNICATION AGGREGATION

SUMMARY

According to an aspect of an embodiment, a text communication aggregator stores text communications between patrons and a contact handling system. The communications each include a tag identifying senders of the text communications. The aggregator further provides the stored text communications as threaded conversations. Each of the threaded conversations include text communications between a particular patron and the contact handling system, and each of the threaded conversations is associated with the particular patron. The aggregator further provides identifiers that identify threaded conversations having at least one new text communication from the patrons.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
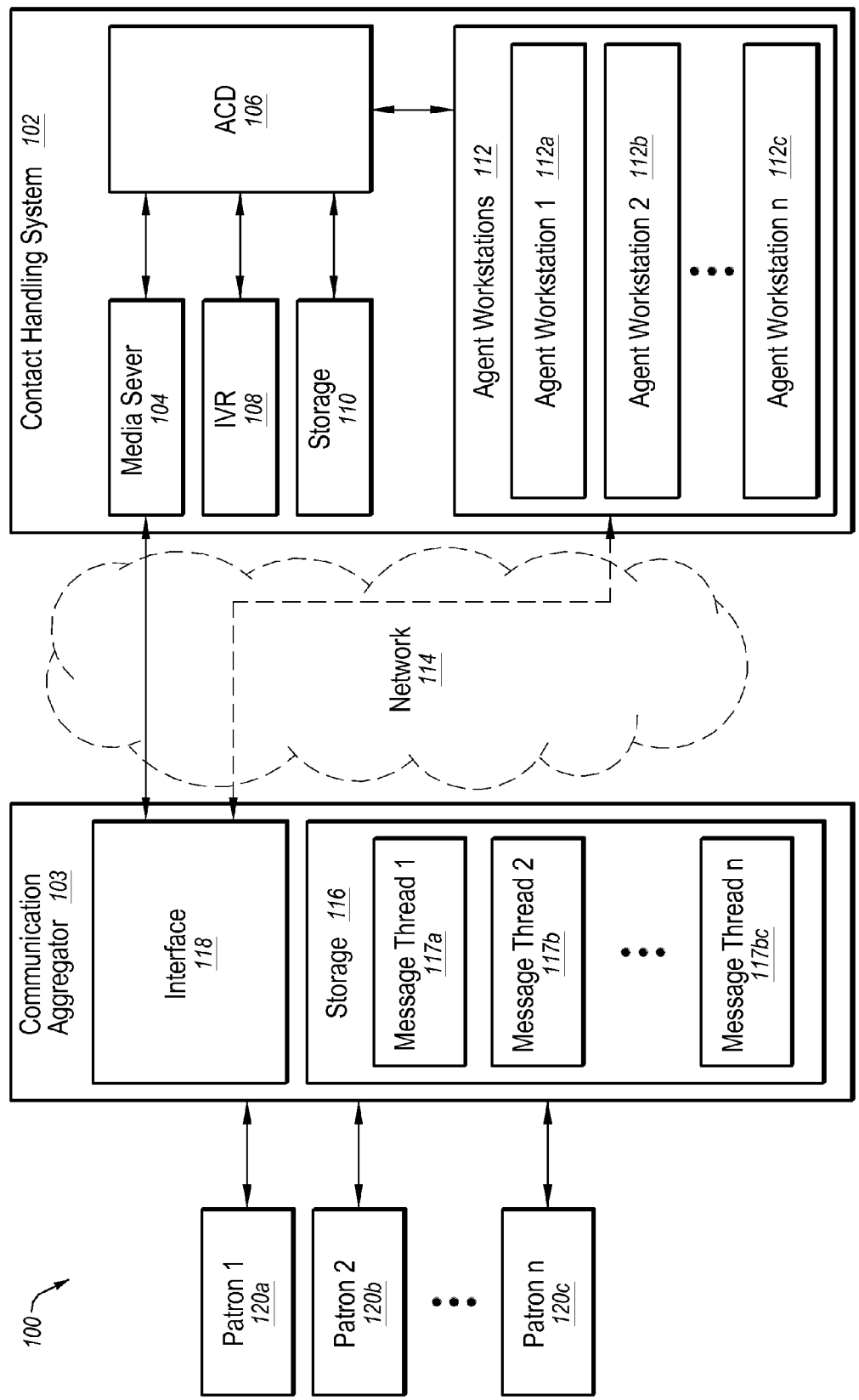
FIG. 1 is a diagram of an example communication aggregation system.

Potential patrons have access to an ever-increasing number of communication types. Patrons with access to multiple communication types may wish to communicate with a contact handling system using communications types not commonly used to communicate with contact handling systems. Alternately or additionally, the patron may wish to use more than one of the communication types to communicate with the contact handling system. In some instances, a particular communication type may be more efficient than another communication type for a particular communication. For example, a short question may be quickly asked in a short message service (SMS) message, an image of an error screen or other issue may be sent in a multimedia messaging service (MMS) message, and/or an involved question or reply may be sent via email, facsimile (fax), or some other medium. Whether for patron convenience, competitive advantage, improved perception of the contact handling system and/or the represented companies (described herein as customers or tenants of the contact handling system), and/or for some other reason, the contact handling system may wish to accommodate communication with patrons over a variety of communication types.

However, contact handling systems may not receive a sufficient volume of a particular communication type to justify the expense of designing, installing, and/or managing systems for receiving, storing, tracking, distributing, and otherwise handling the particular communication type within the contact handling system. In some instances, the contact handling system may wish to employ a third-party communication aggregator ("aggregator") to assist with one or more particular types of communication for the contact handling system. However, integration of the aggregator may be difficult to implement, particularly when each aggregator may offer different systems for accessing the aggregated communications.

In using some conventional aggregator configurations, identifying new communications from patrons and/or creating new communications to patrons at the contact handling system may demand relatively significant contact handling system resources and/or systems. Furthermore, the contact handling system may add additional resources and/or systems to track additional data regarding the communications available through the aggregator, such as tags identifying the patron, the agent, the contact handling system department and/or the supervisor associated with particular communications. Thus, some limitations of conventional aggregators may reduce or eliminate some of the advantages a contact handling system may wish to realize by using the aggregator.

Some embodiments described herein may allow the contact handling system to employ an aggregator with relatively few additional contact handling system resources and/or systems. Some embodiments may allow for improved integration between the contact handling system and the aggregator. Some embodiments may allow for simplified identification of new communication available from the aggregator. Some embodiments may allow the communications to be tagged with various information, such as the identities of the agent, the patron, the contact handling system department, and/or the contact handling system supervisor associated with the communication; whether the underlying purpose for the communication is open or resolved; or the like. Some embodiments may allow for simplified creation of new communication of the type handled by the aggregator. Advantageously, relative to conventional aggregators, some embodiments may demand fewer resources from the contact handling system and/or may provide additional functionality to the contact handling system. Thus, embodiments described herein may allow some communication types to be cost-effectively and/or more efficiently offloaded to aggregators.

Embodiments of the present invention will be explained with reference to the accompanying drawings.

FIG. 1 is a diagram of an example communication aggregation system 100 (herein "system 100"). The system 100 includes a contact handling system 102. The system 100 also includes a third-party communication aggregator 103 (herein "aggregator 103"). The aggregator 103 may receive and send communications having one or more particular communication types from and to patrons, represented by a first patron 120a through an nth patron 120c (collectively "patrons 120"). Components of the aggregator 103 may include storage 116 and an interface 118. In some embodiments, the communication sent to and received from the patrons 120 may include text communication or other visual or audio communication such as SMS messages, MMS messages, email messages, social media messages such as Twitter messages, instant messaging messages, faxes, or the like or any combination thereof. In some instances, the MMS messages may include images, audio recordings, video recordings, and/or text communication.

Components of the contact handling system can include a media server 104, an automatic contact (or call) distributor (ACD) 106, an interactive voice response unit (IVR) 108, storage 110, an agent workstation 112a through an agent workstation 112n (collectively "agent workstations 112"), or the like or any combination thereof.

The media server 104 may handle the communication for communication types such as phone calls, SMS messages, MMS messages, instant messages, fax, conferencing, video conferencing, co-browsing, social media channels, video calling, etc. Media servers 104 can include the traditional telephony PBX (Private Branch eXchange), computer servers handling internet telephony traffic (Voice over Internet Protocol, or VoIP), voice gateways, etc. In some embodiments, the media server 104 may receive communications of one or more communication types from the aggregator 103, as described below.

The ACD 106 may track the state of each contact and of each agent (not shown) associated with the agent workstations 112. The ACD 106 may also supply available agents with waiting contacts. The ACD 106 may control the routing of communications to/from the agent workstations 112.

In some embodiments, the ACD 106 may deliver contacts and/or communication to the agent workstations 112 as generic work items. For example, work items associated with different communication types may be delivered in a similar manner regardless of the communication type. Such generic work items may allow for simplified integration of the aggregator 103 and its associated communication types into the contact handling system 102 and/or the agent workstations 112.

IVR units 108 may be used as the first stage of handling an incoming call or contact. The process usually starts by playing pre-recorded audio prompts (e.g. menu selection choices), and accepting handset touch-tone key presses or Automatic Speech Recognition (ASR) to navigate a menu system to supply automated information (such as business address, hours of operation, etc.) or be routed to one of the agent workstations 112 via the ACD 106. In some instances, the IVR 108 may automatically respond to communication received via the aggregator 103. For example, if the aggregator handles SMS and/or MMS messages, the IVR 108 may respond to SMS and/or MMS inquiries automatically to provide information or support, to request additional information from the patron before transferring the contact to tone of the agent workstations 112, to provide updates regarding the handling of the patron's message, or the like.

Storage 110 can include organized computer disk drives as databases and files. Recordings of phone calls and other interactions with patrons may be stored on the storage 110 for later reference or review. Many aspects of contact handling system activity can be recorded and stored in the storage 110.

In some embodiments, the storage 110 may maintain endpoint-identifier-pairs signifying endpoint-pair association between patron communications and contact handling system 102 communications. The contact handling system 102 endpoint and the patrons' endpoints may be known for each communication sent or received by the contact handling system 102 or patrons 120. Optionally, the unique endpoint pairs may be associated with a patron account, and may be used to access storage 116 for retrieving one or more message threads 117a through 117c (collectively "message threads 117") between the patrons 120 and the contact handling system 102.

In the case of SMS and/or MMS messages, two common forms of endpoint identifiers may include: 1) a caller line identifier (CLI), which may also be known as an automatic number identifier (ANI) in the United States; and 2) short codes. The CLIs and ANIs may be described as long codes. A long code may be, essentially, an ordinary phone number. In the United States, the long code is a 10-digit phone number, possibly requiring an additional "1" if long-distance routing is needed. A short code may be a 5- or 6-digit number assigned to a charitable entity, a business entity, or the like. A person may then enter a particular short code, often encountered via advertising, on a mobile device to send an SMS message to the associated entity. Thus, in some instances, the endpoints of the endpoint pairs for SMS and/or MMS messages may include a long code for the patrons 120 and a long code or a short code for the contact handling system 102. Advantageously, the short code may allow for quicker keypad entry and/or may simplify memorization relative to the long codes. In some embodiments, other communication avenues and/or other endpoint identifiers may be accommodated.

In some embodiments, the communication sent to and received from the patrons 120 may include text communication such as SMS messages, MMS messages, email messages, social media messages such as Twitter messages, instant messaging messages, faxes, or the like or any combination thereof.

Endpoint pairs may be used with other communication types as well. For example, for email communications, the endpoints may include the email addresses of the patron and the contact handling system. Analogously, a fax may include source and destination numbers associated with the patron and the contact handling system. Other communications between patrons and contact handling systems may include other identifiable endpoints that may be stored by the contact handling system and searched to help identify and assist the patron.

The media server 104, the ACD 106, the IVR 108, and the storage 110 are often referred to as "back office" equipment, referring to restricted-access supervisor and control computers (not shown) located in server rooms at the contact handling system 102 facilities where these types of equipment are traditionally installed and operated. Functional lines between them are often blurred, meaning that there are various solutions that may combine or distribute the functions of these servers and storage. For example, certain IVR functions can be done in media gateways. Network connections to a telephony network (not shown) and/or a packet-based network 114 may be used to receive contacts and otherwise connect the ACD 106 to the other elements of the contact handling system 102.

The agent workstations 112 may include traditional desktop computers and phones. Alternately or additionally, agent workstations 112 may also include more-portable electronics such as laptop computers, netbooks, internet-capable phones or tablets for contact handling system agents to interact with patrons and media. Software running on these devices typically includes business applications and programs to interface with the contact handling system, but may extend to programs which can facilitate the embodiments described herein. In some instances, the agent workstations 112 may have access (not shown) to the internet independent of the contact handling system. In some instances, the agent workstations 112 may communicate with the ACD 106 via internet-based applications, web pages, connections, or the like. In some embodiments, the agent workstations 112 may retrieve information from the aggregator 103 independent of the contact handling system 102, as indicated by the dashed line connecting the agent workstations and the interface 118 of the aggregator 103. In some configurations, the ACD 106 may provide the agent workstations with a uniform resource identifier (URI) indicating a location of one or more message threads 117 and the agent workstations 112 may retrieve the one or more message threads 117 over a network 114 such as the internet.

The location of the media server 104, the ACD 106, the IVR 108, and/or the storage 110 may be at the physical location of the contact handling system 102 and/or may be "cloud-based" systems, potentially operated far from the agent workstations 112 and the agents. The agents and the agent workstations 112 may be located at the respective agents' homes and/or at the contact handling system facilities. Cloud-based solutions may facilitate a multi-tenant hosting model, where various business customers of the contact handling system 102 are delivered contact handling system functionality via cloud-based equipment, which is shared among the multiple tenants of the multi-tenant contact handling system 102, with appropriate safeguards for privacy and data security.

The contact handling system 102 may employ the aggregator 103 to receive and aggregate communications having one or more particular communication types and to provide the aggregated communications to the contact handling system 102. The aggregator 103 may further send communications having the one or more particular communication types on behalf of, and as instructed by, the contact handling system 102. As a result, the contact handling system 102 may omit systems for receiving and/or sending communications having the particular communication types at the contact handling system 102.

The aggregator 103 may store communication received from and sent to the patrons 120 as part of message threads. Each of the message threads may be associated with one of the patrons 120. Each message thread may include the communications received from the patron associated with the message thread, as well as the communications sent to the patron associated with the message thread by the aggregator 103 on behalf of the contact handling system 102.

In some embodiments, the interface 118 may include an interface for accessing the aggregator 103 via a network 114, such as an internet-based interface accessible via internet protocols or the like. Alternately or additionally, the interface 118 may include a web-based interface accessible via a web browser or a system with browser-like capabilities. In some embodiments, the interface 118 may include an API layer for creating message threads 117 in two different directions: from the patrons 120 to the contact handling system 102, and from the contact handling system 102 to the patrons 120.

In some embodiments, the interface 118 may allow an agent to create and send a communication to a patron where no message thread exists for the patron. In some instances, the aggregator 103 may provide a separate interface (not shown) for creating a communication for a particular patron when no instance of the interface 118 is available for the particular patron. By way of example, a contact may be proceeding via a communication type not handled by the aggregator 103. The agent in the contact may start (or add to) a message thread for the particular patron by using the aggregator 103 to send the patron a communication via the aggregator 103 interface 118.

The third-party communication aggregator may interface with the contact handling system via a data interchange means such as via internet protocols (e.g., "TCP/IP" protocols) so messages and/or message threads 117 may be exchanged. The third-party communication aggregator may convert messages to and from the patron communication type and the contact handling system communication type. For example, the third-party communication aggregator may receive an SMS message from a patron and forward the message to the contact handling system via internet protocols and vice-versa.

In some embodiments, the third-party communication aggregator may supply a web interface that will display the message thread associated with a patron and allow a new message to be sent to a patron. Such a feature may greatly simplify the integration effort for the contact handling system. Advantageously, when the third-party communication aggregator provides such a simple integration to the contact handling system, the development time for the contact handling system to integrate the communication type is minimized and disruptions to the contact handling system architecture may be likewise minimized.

The agent workstations 112 may be internet-base or may integrate easily with internet services. In instances where the internet-based service is web-based, a web server may deliver a hypertext markup language (HTML) web page to a browser, and URIs may be embedded in the HTML. To render the web page for the agent to view on the agent workstations 112, the web browser may access each URI and may use the content as directed by the page markup. In some instances, a web page may be designed to incorporate a frame or iframe within the web page. Such frames may be dedicated for a specified purpose, or may optionally be populated dynamically by a URI. When the web browser renders the page, the URI may be accessed and rendered within the frame. The URI within the frame may be set according to information supplied by the aggregator 103. In some embodiments, the URI may reference a location of a particular message thread of the message threads 117. Thus, the agent workstations 112 may retrieve a particular message thread from the message threads 117 via a URI provided by the ACD 106, giving the agents access to message threads 117 associated with contacts assigned to the agents.

In some embodiments, additional URI parameters may be specified by the contact handling system 102, such as the names of the agent, the contact handling system department, and/or the supervisor handling the communication, or any other information the contact handling system wants associated with the communication and/or the message threads 117. When the web page is rendered and the third-party communication aggregator's URI is accessed, the content delivered by the web page may display the message thread within the designated frame, allowing the agent to read all communications in the thread as well as send communications to the client.

Regardless of the particular communication type used, in some embodiments, the message threads 117 may include a sequence of a text-based communications between the patrons 120 and the contact handling system 102. In some embodiments, the message threads 117 may include any media type with text content, such as SMS messages, MMS messages, chat messages, faxes, email, notes generated by the agents and/or the contact handling system 102, transcripts from audio or video interactions, and/or the like. If the contact handling system 102 can relate incoming contacts to one of the existing message threads 117, the existing message thread may be accessed and read by an agent to become familiar with the conversational context of the incoming contact. The agent may then reply if appropriate, supplying the patron with relevant message content. In some instances, each message in a message thread may include a date and time identifier to assist the agent in identifying the conversational context. Each text-based message sent by either party may be added to the message thread.

The phone numbers, email addresses, fax numbers, and other contact information associated with particular patron accounts may be available to the contact center, in which case the patron accounts may be associated with message threads 117 including multiple communication types. Thus, in some instances, the message threads 117 between the patrons 120 and the contact handling system 102 may be maintained without regard to the exact communication type employed.

From the message threads 117, the agent may be able to determine conversational contexts. For example, a new SMS message and/or MMS message, without more, from one of the patrons 120 may fail to provide sufficient information for the agent to assist the patron without prompting the patron for details. However, previous messages to and from the patron may provide sufficient context for the agent to assist the patron.

For example, a particular agent may receive a message from a patron in response to a message sent by another agent who is no longer available. Similarly, the message may be part of a larger conversation where some time has passed between messages. Even if the message is delivered to the same agent who handled other messages in the same conversation, the agent may not be able to recall the state of the conversation from a single message given the significant number of other conversations (with other patrons) of which the agent may experience. Thus, the message thread may provide conversational context for one or more new messages. The message thread may also allow an agent to avoid asking questions, explaining things, or otherwise covering topics already covered by another agent.

In some embodiments, the aggregator 103 is stores tags (not shown) associated with individual communications and/or the message threads 117. The tags may provide information to the contact handling system 102 regarding the associated communications and/or message threads 117. For example, a particular message thread may be tagged with a patron identifier used by the contact handling system 102 to track the various patrons 120. Alternately or additionally, each message may be tagged with an agent identifier identifying the agent who received or sent the particular message, whether the message was sent via an automated system such as the IVR 108, or the like. Similarly, a particular message thread may be tagged with agent identifiers for each agent who has sent or received a message in the message thread and/or an agent identifier identifying the agent who sent or received the most recent message in the message thread.

In some embodiments, the message threads 117 may include text not received from or sent to the patrons 120. For example, notes may be provided by the contact handling system 102 and added to the message threads 117. Alternately or additionally, the contact handling system 102 may provide transcripts of verbal and/or video contacts with the patrons 120 so that agents may be able to better determine a conversational context in future contacts with the patron. In some instances, transcripts may be provided only for particular high-priority patrons 120 to optimize the experience of the particular high-priority patrons 120 without the expense of transcribing all verbal and/or video contacts.

In some embodiments, the aggregator 103 may provide a listing or the like identifying those message threads 117 and/or associated URIs having new communications not previously attended to by the contact handling system 102. The contact handling system 102 may monitor the listing and may distribute the message threads 117 having new communications to available agents via the ACD 106.

In some embodiments, the contact handling system 102 may attempt to match a new message to the agent who sent or received the previous message in the message thread. In some instances, if the most recent agent is not available, the contact handling system 102 may attempt the prior agent and so on until an available agent is identified or all of the agents associated with a message thread are considered. Thus, the patron may be more likely to interact with an agent familiar with the conversation and who has interacted with the patron previously.

In some instances, the contact handling system 102 may wait to provide a new message to an agent until an agent associated with the message thread is available, particularly if the communication type is one where the patron may not expect a particularly prompt response. By attempting to match a new message with an agent who has worked with the patron previously, the agents collectively may spend less time reading through message threads to determine conversational context, as fewer messages may sufficiently jog the agents' memories. Furthermore, the patron may appreciate dealing with relatively fewer agents when contacting the contact handling system 102.

Alternately or additionally, messages may be tagged with a date and/or a time the message was received or sent. Other optional tags may include identifiers identifying the contact handling system department that handled the message, whether a particular message was reviewed by a supervisor and/or the identity of the supervisor who reviewed the message, whether the underlying purpose of a message has been resolved, or the like or any combination thereof.

Figure 2:
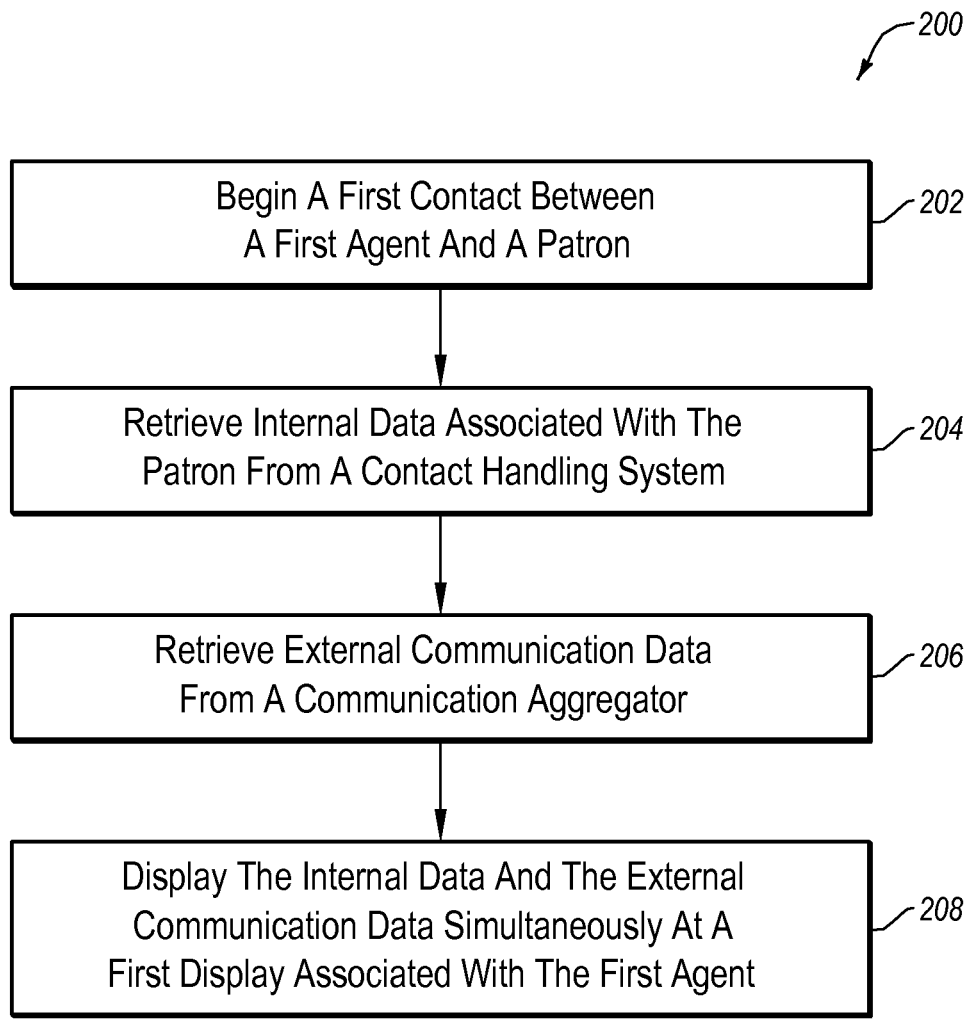
FIG. 2 is a flow diagram of an example method of performing a contact using aggregated communication.

FIG. 2 is a flow diagram of an example method 200 of performing a contact using aggregated communication. In some embodiments, the method 200 may be performed at the agent workstations 112 of the contact handling system 102 of FIG. 1.

The method 200 may begin at block 202, where a first contact may be started between a first agent and a patron. The agent may generally correspond to the agents described with reference to FIG. 1. The patron may generally correspond to one of the patrons 120 described with reference to FIG. 1.

The method 200 may continue at block 204, where internal data associated with the patron may be retrieved from a contact handling system. The contact handling system may generally correspond to the contact handling system 102 described with reference to FIG. 1.

The method 200 may continue at block 206, where external communication data may be retrieved from a communication aggregator. The communication aggregator may generally correspond to the aggregator 103 described with reference to FIG. 1. The external communication data may include text communication exchanged between the patron and the contact handling system. In some embodiments, the text communication may include SMS messages and/or MMS messages. Optionally, the external communication data may include an agent identifier associated with the SMS messages and/or the MMS messages.

The method 200 may continue at block 208, where the internal data and the external communication data may be displayed simultaneously at a first display associated with the first agent. The first display may generally correspond to a display of an agent workstation of the agent workstations 112 described with reference to FIG. 1. In some embodiments, the external communication may be displayed within a frame on the display. Alternately or additionally, the external communication may be retrieved via a data connection between the contact handling system and the communication aggregator. In some embodiments, the data connection may include a Transmission Control Protocol/Internet Protocol (TCP/IP) connection. Optionally, the external communication data may be retrieved via a world-wide web interface.

In some embodiments, the method 200 may further include receiving a text input from the first agent at an agent workstation including the display and sending the text input to the communication aggregator. In some instances, the method 200 may further include sending an agent identifier associated with the first agent.

In some embodiments, the method 200 may further include ending the first contact between the first agent and the patron. A second contact may be started between a second agent and the patron. The first data may be retrieved from the contact handling system again. The second data may also be retrieved from the communication aggregator external to the contact handling system. The first data and the second data may be displayed at a second display associated with the second agent.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A text communication aggregator that performs operations comprising:
    storing text communications between patrons and a contact handling system, the text communications each including a tag identifying senders of the text communications;
    providing the stored text communications as threaded conversations via a web interface, the text communication aggregator including an application program interface (API) layer that creates the threaded conversations, each of the threaded conversations including text communications between a particular patron and the contact handling system, and each threaded conversation associated with the particular patron; and
    providing identifiers that identify threaded conversations having at least one new text communication from the patrons,
    wherein the web interface updates the threaded conversations with new text communications made between the particular patron and the contact handling system.

2. The text communication aggregator of claim 1, further performing operations comprising:
    receiving a reply text communication from a first agent of the contact handling system to a first patron;
    sending the reply text communication to the first patron; and
    storing the reply text communication with a tag identifying the first agent as the sender of the reply text communication.

3. The text communication aggregator of claim 1, wherein the senders of the text communications include: an agent of the contact handling system, a patron, an interactive voice response unit of the contact handling system, or an automated text communication generator of the contact handling system.

4. The text communication aggregator of claim 1, wherein the web interface allows an agent of the contact handling system to send a reply text communication to the particular patron associated with a particular threaded conversation.

5. The text communication aggregator of claim 1, wherein a second web interface allows an agent of the contact handling system to compose and send a text communication.

6. A method comprising:
    beginning, at a contact handling system, a first contact between a first agent and a patron;
    retrieving internal data associated with the patron from the contact handling system;
    retrieving external communication data from a communication aggregator external to the contact handling system via a data connection between the contact handling system and the communication aggregator, the data connection including an internet connection, the external communication data including text communication exchanged between the patron and the contact handling system;
    displaying the internal data and the external communication data simultaneously at a first display associated with the first agent;
    ending the first contact between the first agent and the patron;
    beginning, at the contact handling system, a second contact between a second agent and the patron;
    retrieving again the internal data from the contact handling system;
    retrieving again the external data from the communication aggregator external to the contact handling system; and
    displaying the internal data and the external data at a second display associated with the second agent.

7. The method of claim 6, wherein the text communication includes at least one of: short message service (SMS) messages and multimedia message service (MMS) messages.

8. The method of claim 7, wherein the external communication data further includes an agent identifier associated with each of the SMS messages and MMS messages.

9. The method of claim 6, wherein the external communication data is displayed within a frame.

10. The method of claim 6, wherein the external communication data is retrieved via a world-wide web interface.

11. The method of claim 6, wherein the display is further associated with an agent workstation, the method further comprising:
   receiving a text input from the first agent at the agent workstation; and
   sending the text input to the communication aggregator.

12. The method of claim 11, wherein the text input is sent to the communication aggregator via a data connection such that the text input is sent to the patron via a short message service (SMS) connection or a multimedia messaging service (MMS) connection.

13. The method of claim 12, further comprising sending an agent identifier associated with the first agent.

14. A method comprising:
   beginning, at a contact handling system, a first contact between a first agent and a patron;
   retrieving internal data associated with the patron from the contact handling system;
   retrieving a threaded conversation via a Transmission Control Protocol/Internet Protocol (TCP/IP) connection from a text communication aggregator external to the contact handling system, the threaded conversation including:
      a first text communication sent from the patron to the text communication aggregator;
      a second text communication sent to the patron from the text communication aggregator; and
      a first agent identifier associated with the second text communication;
   displaying the internal data and the threaded conversation simultaneously at a first display of a first agent workstation associated with the first agent;
   receiving a third text communication message via a first input of the first agent workstation
   sending the third text communication to the text communication aggregator via the TCP/IP connection such that the text communication aggregator will send the third text communication message to the patron and update the threaded conversation to include the third text communication;
   sending a second agent identifier associated with the first agent to the text communication aggregator via the TCP/IP connection such that the text communication aggregator will associate the second agent identifier with the third text communication message in the updated threaded conversation;
   ending the first contact between the first agent and the patron;
   beginning, at the contact handling system, a second contact between a second agent and the patron;
   re-retrieving the internal data from the contact handling system;
   retrieving the updated threaded conversation from the text communication aggregator; and
   displaying the internal data and the updated threaded conversation at a second display of a second agent workstation associated with the second agent.

* * * * *